(12) United States Patent
Atiya

(10) Patent No.: US 6,967,413 B2
(45) Date of Patent: Nov. 22, 2005

(54) TIDAL ENERGY SYSTEM

(76) Inventor: Ramez Atiya, 1320 E. 700 South, Salt Lake City, UT (US) 84102

(*) Notice: Subject to any disclaimer, the term of this patent is extended or adjusted under 35 U.S.C. 154(b) by 0 days.

(21) Appl. No.: 10/888,252

(22) Filed: Jul. 9, 2004

(65) Prior Publication Data

US 2005/0052031 A1 Mar. 10, 2005

Related U.S. Application Data

(60) Provisional application No. 60/500,420, filed on Sep. 5, 2003.

(51) Int. Cl.[7] .................... F03B 13/00; F03B 13/10; F03B 13/12; H02P 13/12
(52) U.S. Cl. .................. 290/43; 290/53; 290/54
(58) Field of Search ................ 290/42, 43, 53, 290/54; 416/7, 85; 415/912, 910, 907, 7; 405/11, 12, 15, 133, 185, 272, 78; 60/398, 495

(56) References Cited

U.S. PATENT DOCUMENTS

| 2,463,808 A | * | 3/1949 | Russel | 405/11 |
|---|---|---|---|---|
| 3,959,663 A | * | 5/1976 | Rusby | 290/53 |
| 4,034,231 A | * | 7/1977 | Conn et al. | 290/53 |
| 4,039,847 A | * | 8/1977 | Diggs | 290/42 |
| 4,053,787 A | * | 10/1977 | Diggs | 290/54 |
| 4,123,185 A | * | 10/1978 | Hagen et al. | 405/76 |
| 4,261,171 A | * | 4/1981 | Atencio | 60/398 |
| 6,281,597 B1 | * | 8/2001 | Obermeyer et al. | 290/54 |
| 6,443,653 B1 | * | 9/2002 | Zingale | 405/76 |
| 6,759,757 B1 | * | 7/2004 | Campbell | 290/54 |
| 6,831,373 B1 | * | 12/2004 | Beaston | 290/43 |
| 6,863,806 B2 | * | 3/2005 | Stark et al. | 210/170 |
| 2004/0222641 A1 | * | 11/2004 | Panholzer | 290/43 |

FOREIGN PATENT DOCUMENTS

JP 356139305 A * 10/1981

OTHER PUBLICATIONS

Clark, Robert H., Tidal Power, vol. 4 Energy Technology, and the Environment, Woley Enclycopedia Series in Environmental Science, 1995 pp. 2649–2659 & 2666–2673.

Severn Barrage Committee, The Severn Barrage Project, General Report, Energy Paper No. 57, Department of Energy, London, pp. vii–xiii & 7–20 & 37–39.

* cited by examiner

Primary Examiner—Darren Schuberg
Assistant Examiner—Julio Gonzalez

(57) ABSTRACT

The Tidal Energy System is a structure capable of extracting energy from the potential and kinetic energies of the tides, as well as from ocean waves and offshore wind. Its components operate synergistically in multiple capacities to extract energy from these sources so that the Tidal Energy System operates as unit. The Tidal Energy System is structured so that it can be operated integrally with electrolyzer and fuel cell technology to produce on demand power thus eliminating the pulse character of conventional tidal power. The Tidal Energy System can also generate hydrogen as an end product.

6 Claims, 13 Drawing Sheets

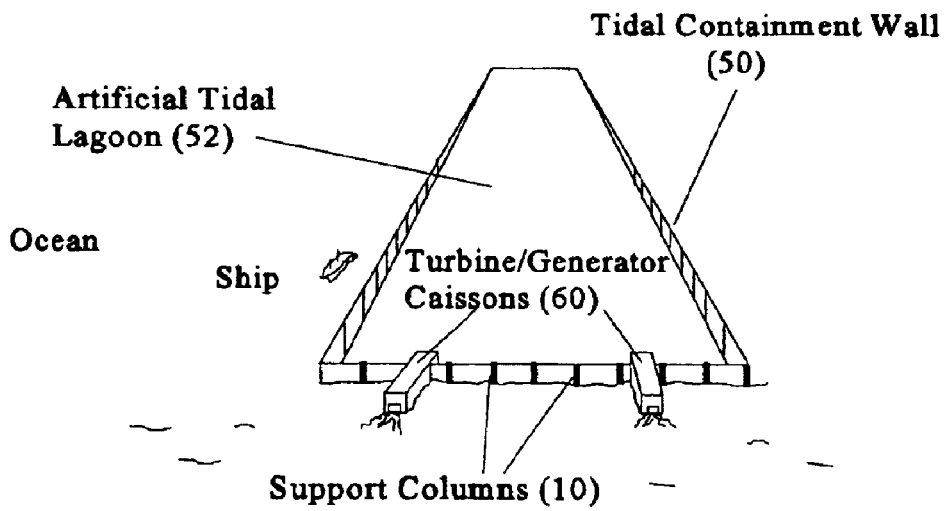
Fig. 1 A - Tidal Energy System (60) : Completely Offshore
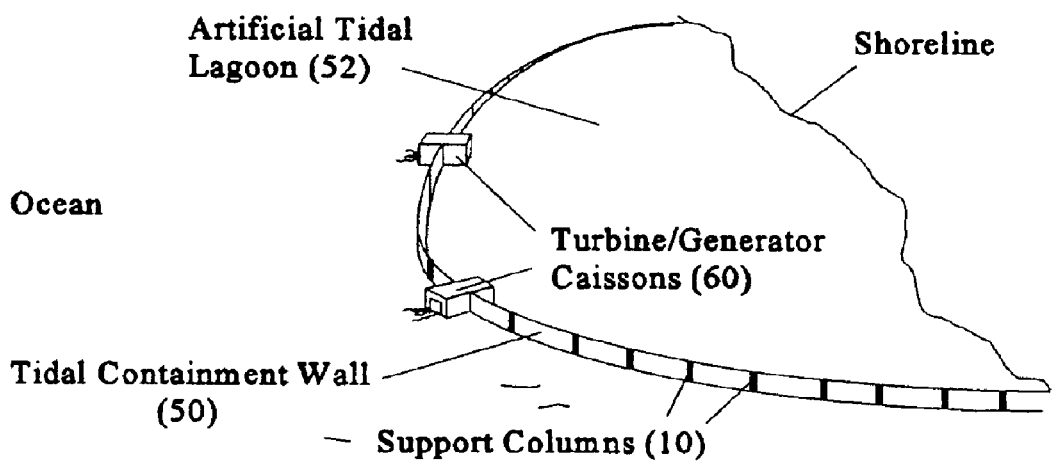
Fig. 1 B - Tidal Energy System (60): Bounded by Shoreline
Figure 1 - Tidal Energy System : Two Configurations

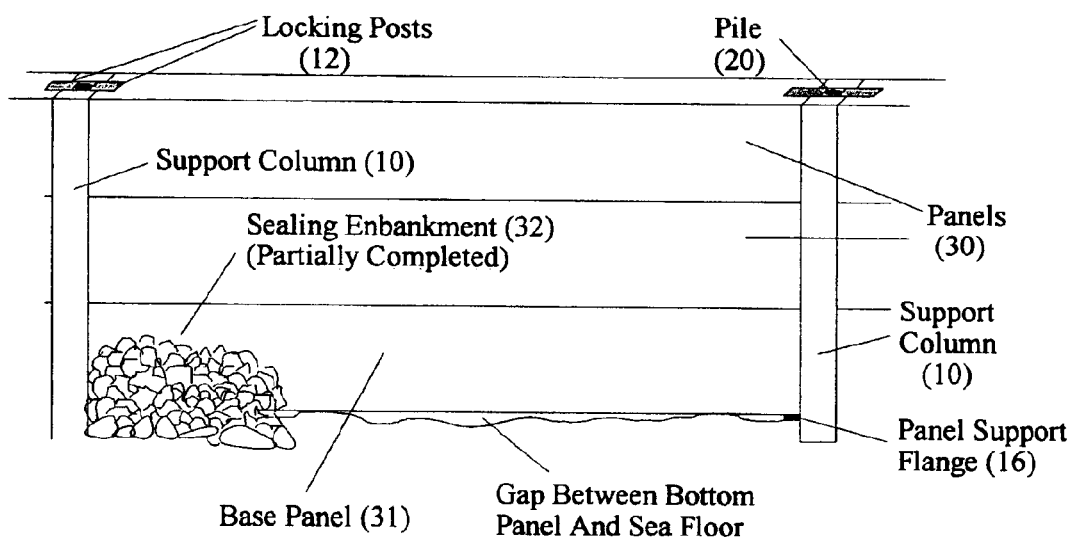
Figure 2 - Tidal Containment Wall Section (36)

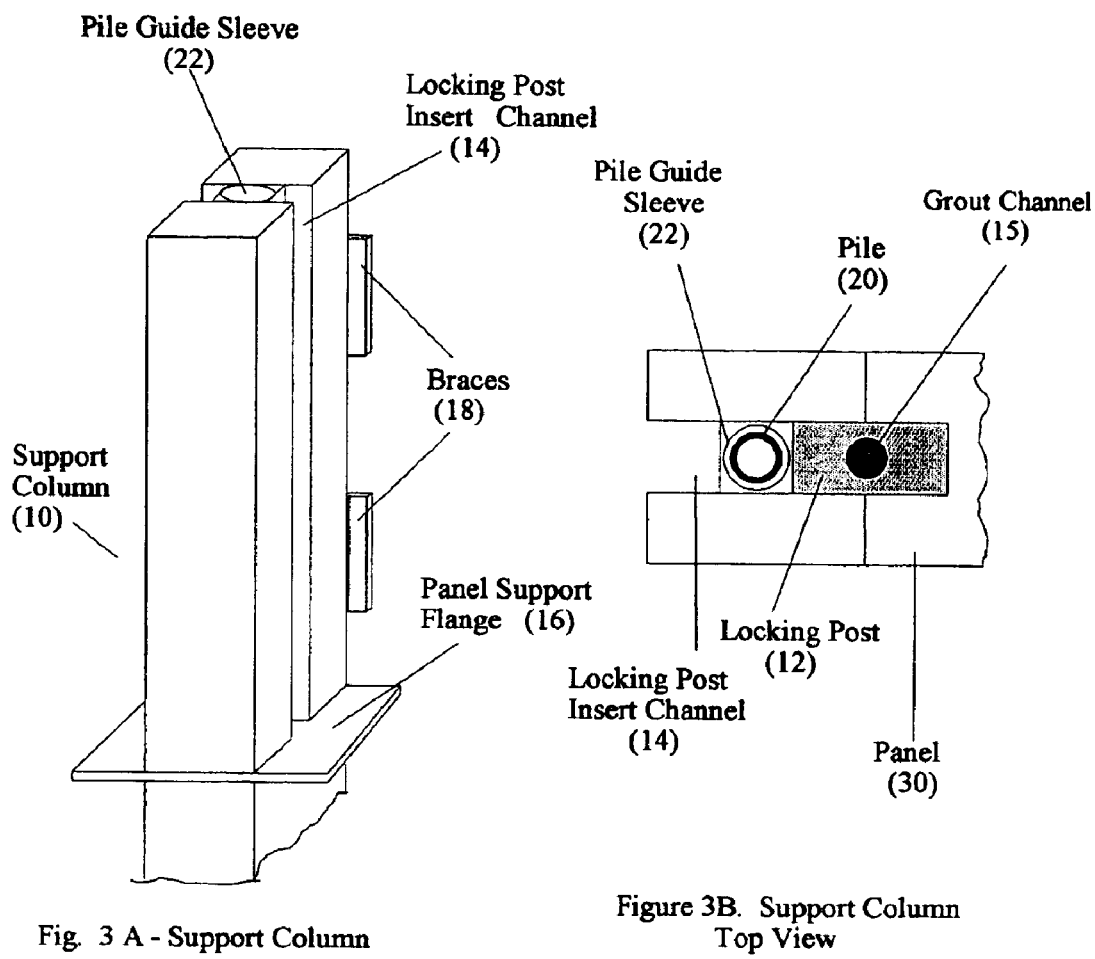
Fig. 3 A - Support Column
Figure 3B. Support Column Top View

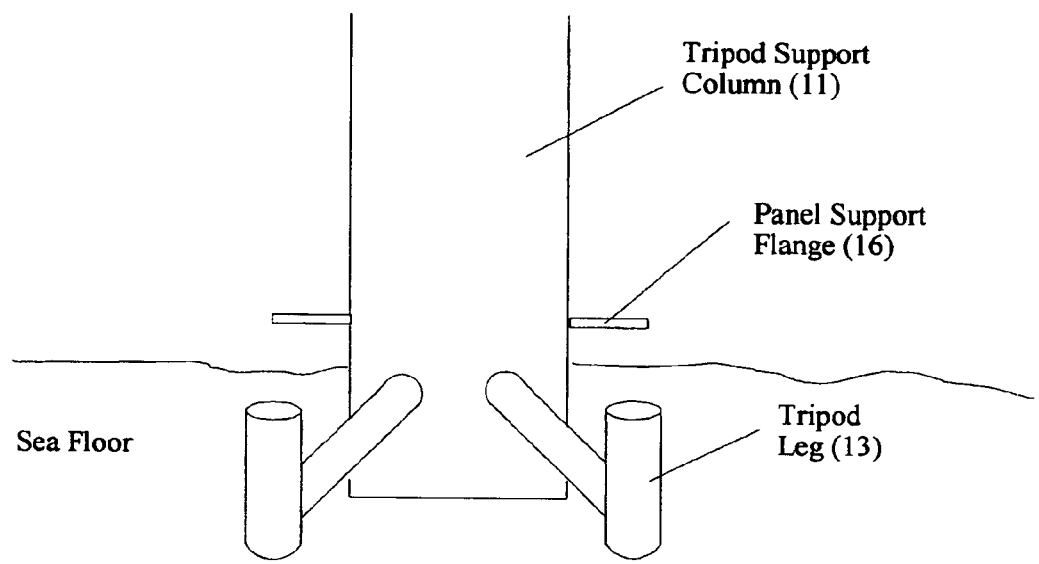
Fig. 3 C - Tripod Support Column (11) With The Third Leg Hidden Behind the Column

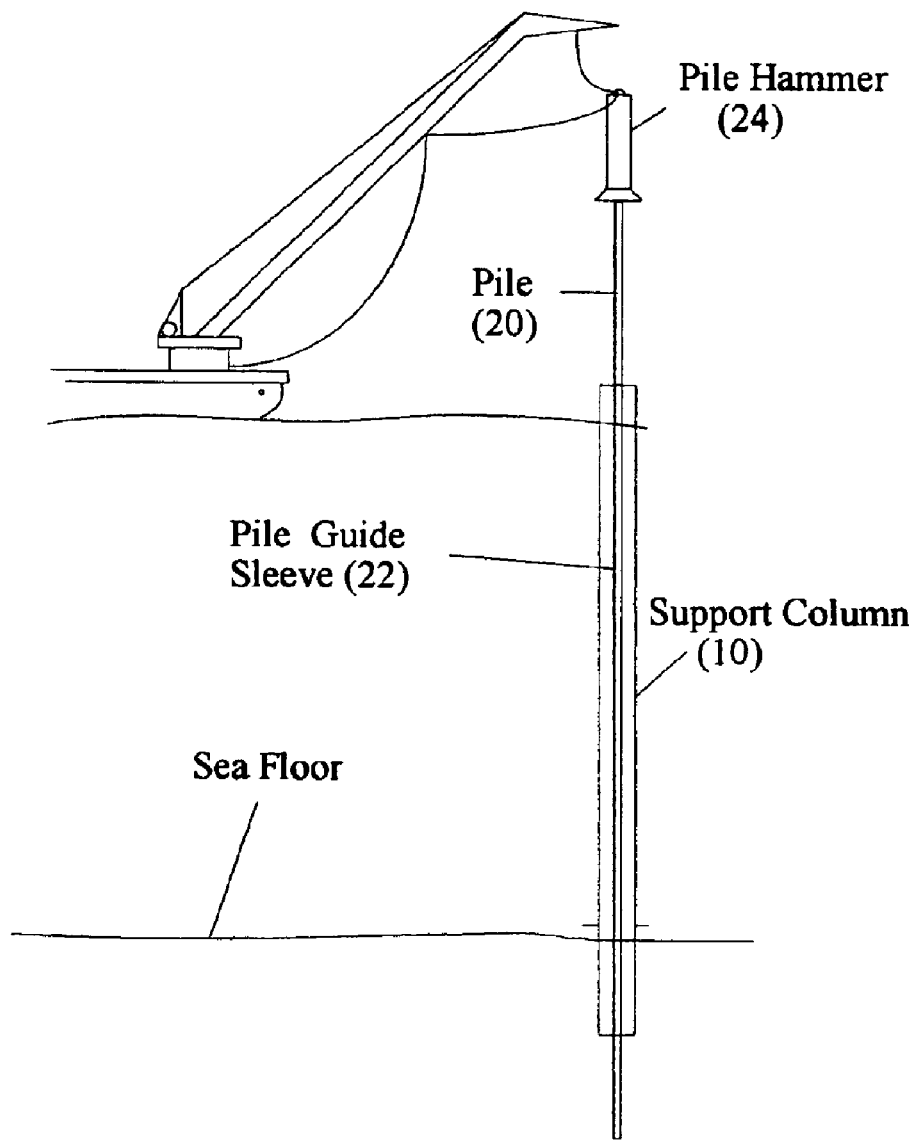
Fig. 4. The Pile Being Driven Through The Support Column Guide Shaft And Into The Sea Floor

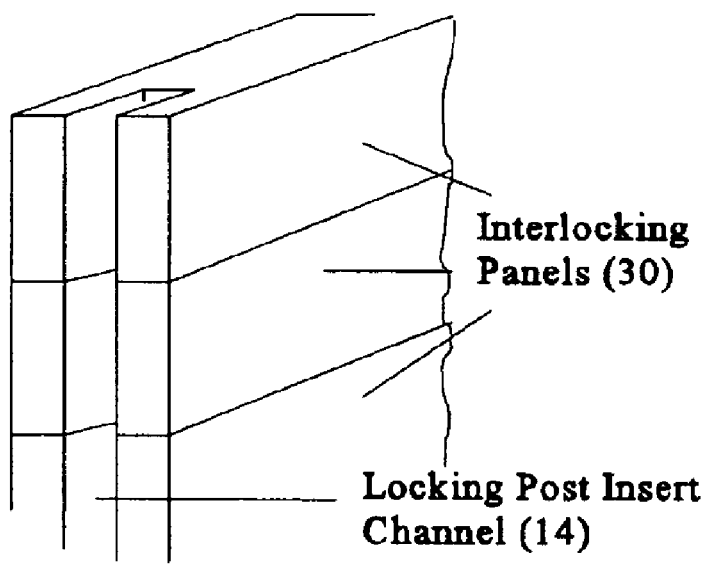
Fig. 5 - Panels: Cross Section
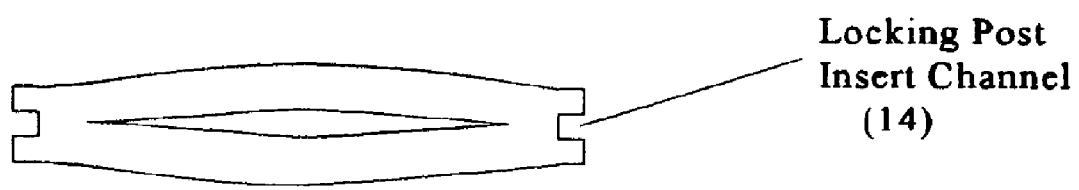
Fig. 5 A. Top View of Panel Showing Arch

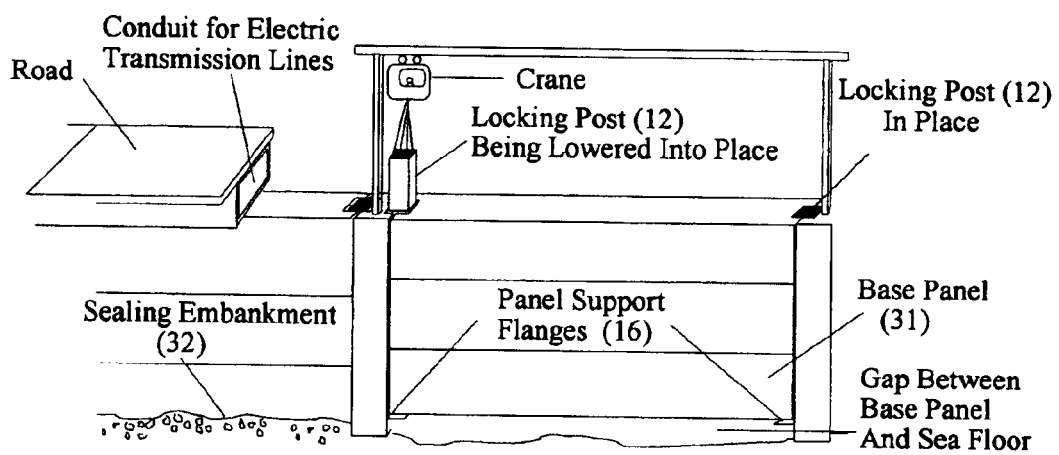
Fig. 6 - Locking Post (12) Being Inserted Between Support Column and Panel

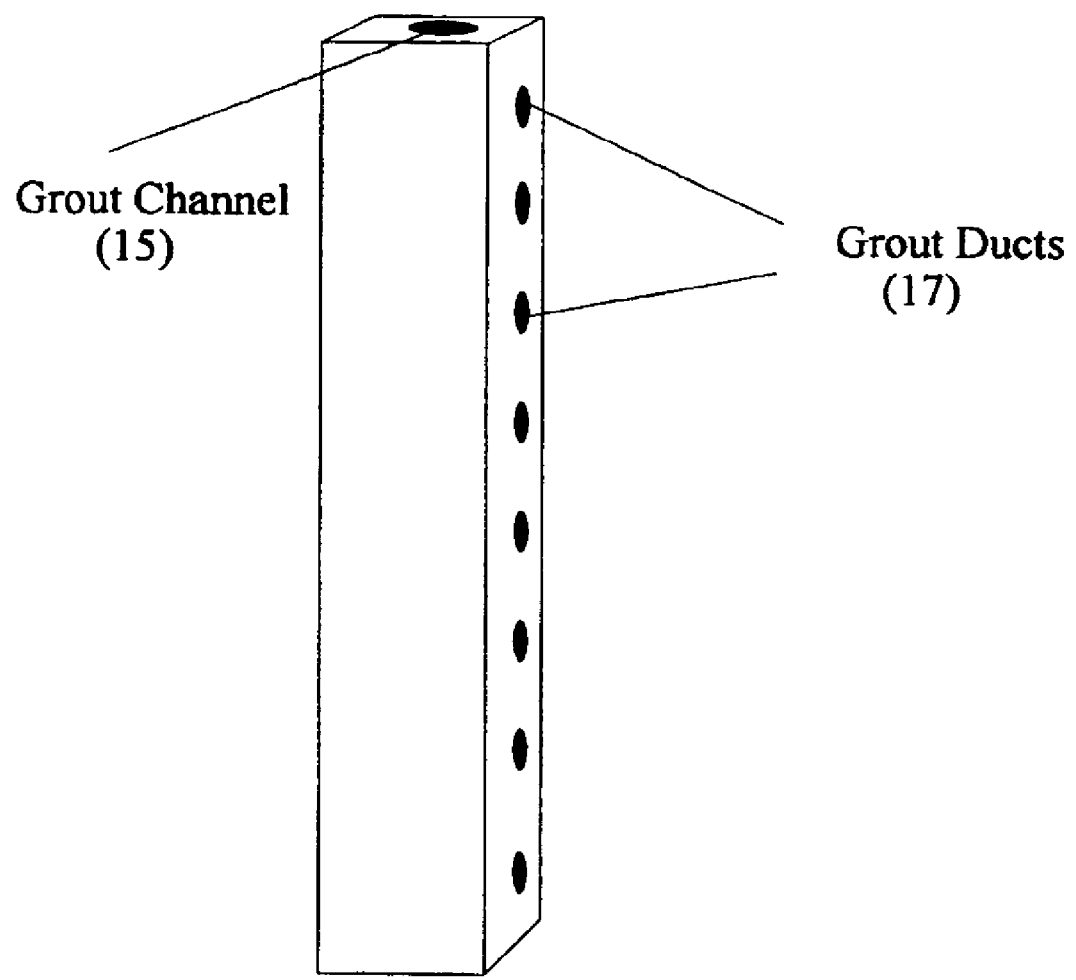
Fig. 6 A - Locking Post (12)

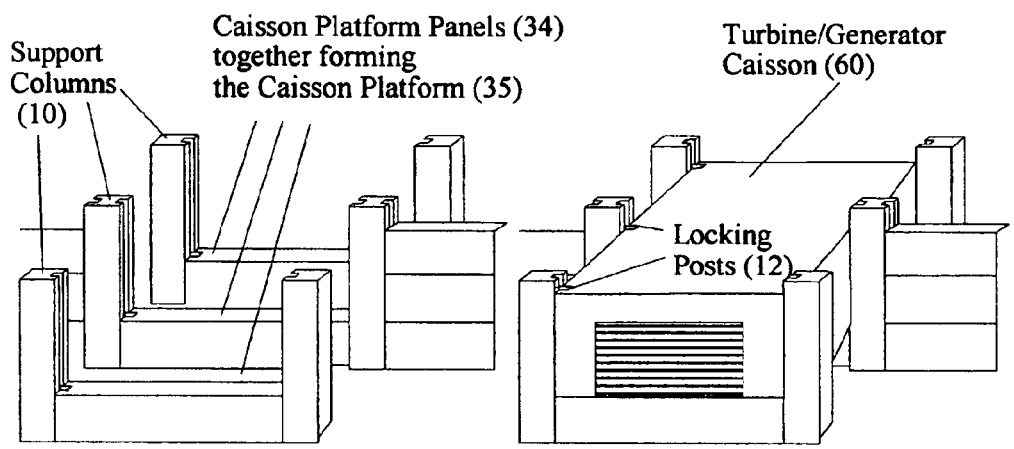
Fig. 7 A. The Caisson Platform
Fig. 7 B. Caisson Section (37) Completed with Turbine/Generator Caisson In Place
Fig. 7 Turbine/Generator Caisson Placement

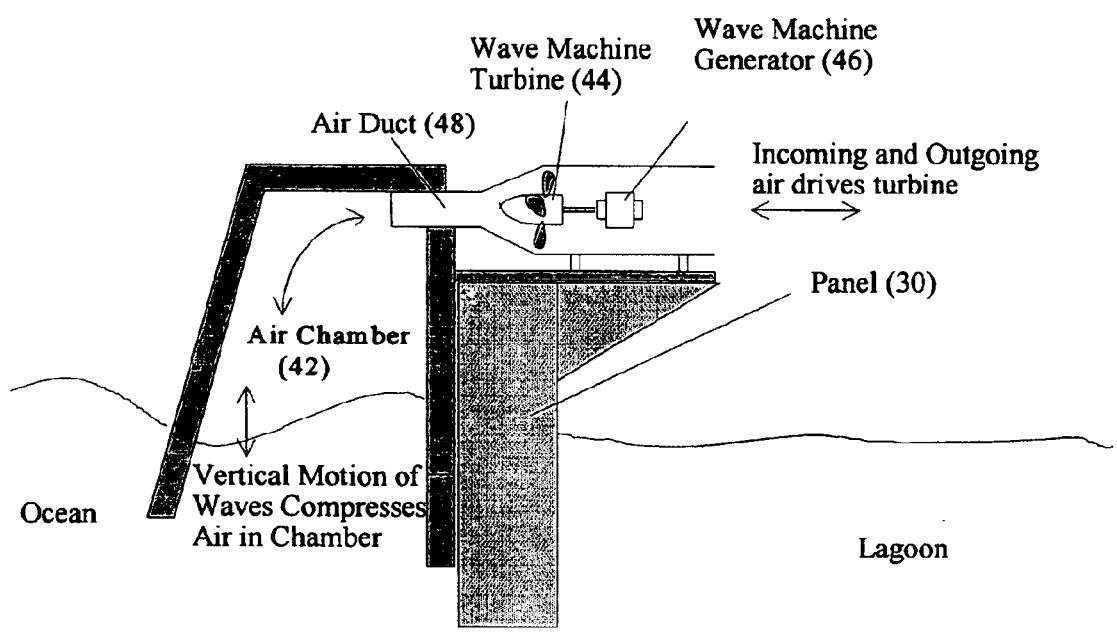
Fig. 8 - Wave Machine (40) Mounted on The Top
Panel of a Tidal Containment Wall Section

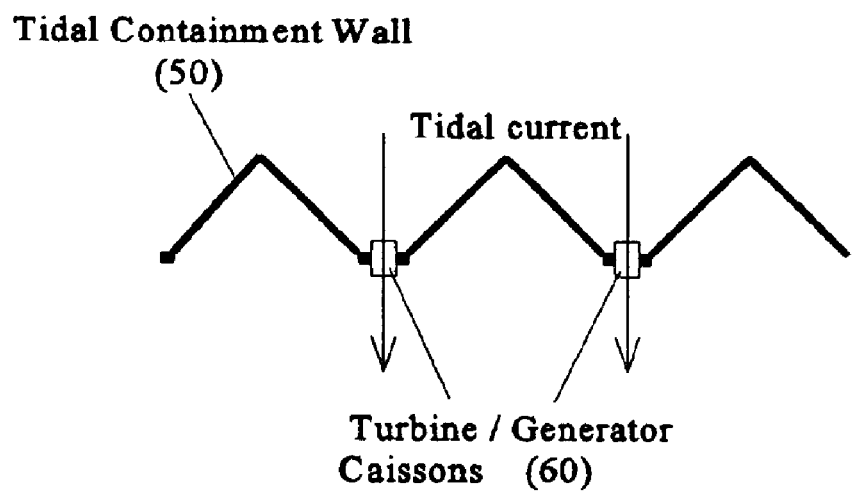
Fig. 9 - Tidal Containment Wall Modified for Tidal Currents

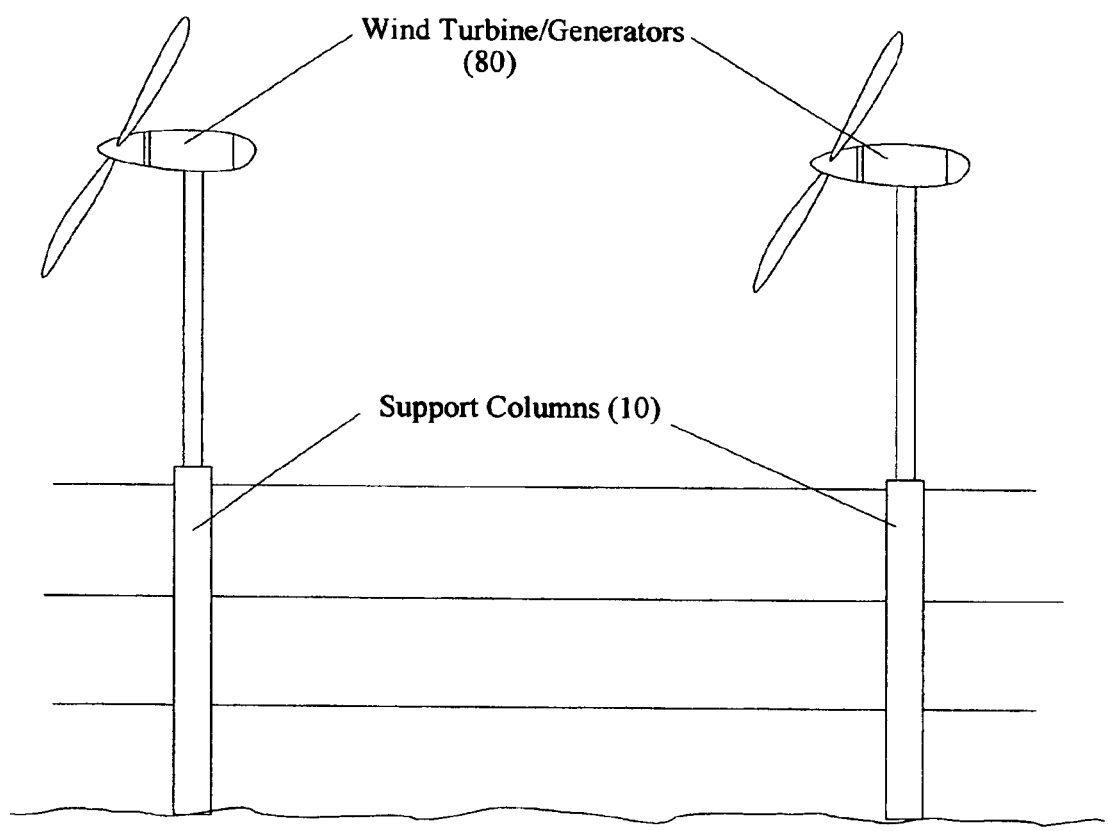
Fig. 10 - Wind Turbine/Generators Mounted on Support Columns

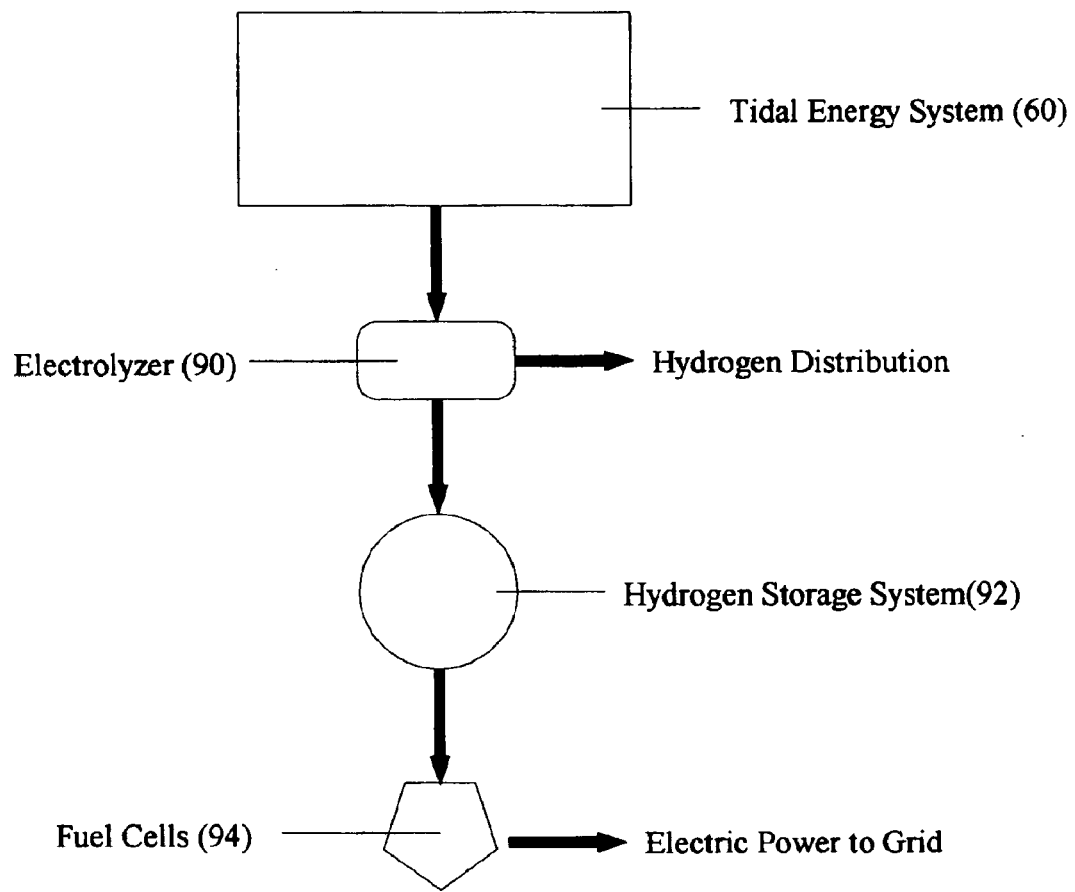
Fig. 11 - Hydrogen System Flow Chart

TIDAL ENERGY SYSTEM

CROSS-REFERENCE TO RELATED APPLICATIONS

This application claims the benefit of PPA 60/500,420 filed Sep. 05, 2003.

FEDERALLY SPONSORED RESEARCH

Not Applicable

SEQUENCE LISTING OR PROGRAM

Not Applicable

BACKGROUND OF INVENTION—FIELD OF INVENTION

This invention relates to the generation of power from ocean tides, ocean waves, and offshore wind and the integration of hydrogen technology with tidal energy.

BACKGROUND OF INVENTION

The general principles behind the generation of electric power from the tides are straightforward. A conventional tidal power station places a barrage across the mouth of an estuary. The barrage acts as a dam separating the water in the estuary from that in the ocean. The barrage exploits the difference in water levels between ocean and estuary caused by the flooding and ebbing of the tides. Power is generated by allowing water to pass through turbine/generators set into the barrage.

The barrage consists of three elements: (1) turbine/generators set below the low water level, (2) sluiceways that control the flow of water between ocean and estuary, and (3) inactive sections whose only function is to separate ocean and estuary. There are two basic modes of power generation: (1) single-effect, and (2) double-effect. In the first phase of single-effect generation, rising tidal waters in the ocean fill the estuary through the sluiceways. When the tide is at a maximum, the second or waiting phase begins. The gates to the sluiceways and the turbines are closed and remain so until the tide in ocean is at near minimum height. The third is the power phase. When the tidal level in the ocean is near minimum, the difference in water levels between ocean and estuary is at a maximum, thereby creating a maximum pressure head. The gates to the turbine/generators are then opened, allowing water to flow through and activate the turbines, which in turn activate the generators, producing electric power. Thus, in single-effect generation, power is produced from water flowing from estuary to ocean and never in the opposite direction. Single-effect generation requires unidirectional turbines. Two pulses of power are produced each day. Double-effect generation is bi-directional. A pulse of power is generated when the water level in the ocean is high and the level in the estuary is low and another pulse is produced when the levels are reversed. Double-effect generation is therefore bi-directional, generating power through flow from ocean to estuary and vice versa. Double-effect generation produces four pulses of energy. For both single and double effect modes, added energy is generated by operating turbines as pumps to further increase the difference in water levels between ocean and estuary. It can be shown that when pumped storage is used, double-effect generation produces only about 10% more energy than single-effect generation (rather than twice as one might expect) [Clark, Robert H., Tidal Power in Energy, Technology, and the Environment, Wiley Encyclopedia Series in Environmental Science, pp. 2647–2673].

Although the basic principles of tidal power generation are straightforward and the energy stored in the tides is sufficient to meet worldwide energy needs many times over, several factors have prevented the widespread development of tidal power: (a) Cost: Conventional tidal power stations are expensive to build and are rarely cost effective, (b) The Limited Number of Suitable Sites : There are very few sites worldwide that have all the special features required to make a tidal power stations cost effective, (c) Environmental Concerns, and (d) The Pulsed Nature of Tidal Power.

(a) Factors Contributing to the High Cost of Conventional Tidal Power Plants

The construction costs of tidal barrages are very high with two thirds of the total going to the civil works. A tidal barrage is assembled from prefabricated units called caissons. Caissons are watertight boxes made of reinforced concrete or steel. They are fabricated on-shore, floated out to the site and set side by side to form the length of the barrage. A typical caisson is 80 m in length by 50 m in width. Three types of caissons are used: (i) sluice caissons equipped with gates to control the flow of water between estuary and ocean, (ii) power caissons housing the turbine/generator units, (iii) blank caissons that provide links between the other two.

Construction methods described below are based on those which were to be used on the Severn Barrage Project [The Severn Barrage Project, General Report by the Severn Tidal Power Group, Energy Paper 57, Department of Energy, UK, pp. vii-x]. The Project would have built a 15.9 km barrage across the estuary of the Severn River in Wales at a cost £ 8280 million. Its 8640 MW generating capacity (single-effect) would have produced 17 TWh per year or 7% of the total electrical power electrical consumption of the UK. Plans were completed in 1981. However, due to high cost and environmental concerns, the Severn Barrage was never built. The most advanced and cost effective construction methods were incorporated into the design. These methods remain state of the art. It is against the background of the Severn Barrage Project that the advantages of the Tidal Energy System become most evident. Construction of a barrage such as the proposed Severn Barrage proceeds in three main steps [The Severn Barrage Project, Ch. 2, pp. 16–25].

The first step it to provide a level surface along the sea floor on which to set the caissons. The operation begins with dredging carried out by cutter suction dredgers. Once a reasonably level surface has been prepared over the entire length of the barrage, a layer of crushed rock is laid down accurately to provide a level surface on which to rest each caisson. Unlike a conventional hydroelectric facility in which a dam must span the short distance across a river, a tidal barrage must span the much greater distance across the mouth of an estuary. Ground preparation for a tidal barrage must therefore be carried out across a considerable distance. In the case of Severn Barrage Project some 18 million cubic meters of sea bed would have to be moved in creating a level surface. Leveling the sea floor in preparation for the placement of caissons is therefore a major and very costly piece of engineering.

The second step is the placement of caissons. Once a level surface has been prepared, caisson placement begins. This is a time intensive and delicate procedure. The caissons are prefabricated at a nearby facility on shore and floated out into position using three or four ocean going tugs. Once correctly positioned, a caisson is set down by ballasting with water and with material excavated in step one. If the caisson is incorrectly placed, it must be refloated and the procedure repeated. Because caissons are large (typically 80 m×50 m), accurate placement can be carried out only in good weather. Furthermore, tidal currents must be at minimum (typically less than 1 m/s) in order to maneuver the large caissons into place. Caisson placement is therefore carried out at neap tide. (Neap tides are ones having the minimum tidal height for a given location. They occur twice each month). The Severn Barrage Project planned for the placement of two caissons per month. The slow rate at which caissons must be placed makes construction time very long. For the Severn Barrage, the placement of the 370 caissons required to span the estuary would consume most of the 84 month construction time. The long construction time adds to the financing cost. In fact the time factor can become the dominant cost in financing a tidal barrage.

The third step is to install the electrical system and to tie it into the grid.

We will refer to a facility built according to construction methods described above as a conventional tidal barrage or a conventional tidal power station.

We can now identify the following main factors contributing to the high cost of the civil works for a conventional tidal barrage:

The large amount of material required to build a tidal barrage—The reasons for the large amount of material are twofold. First, caissons must be massive in order to remain in place under tidal and other environmental loads. Second, a conventional tidal barrage must span the large distance across the mouth of the estuary. The large amounts of reinforced concrete required is a major contributor to the high cost of a conventional tidal barrage.

The major ground preparation required for placement of caissons—Caissons require a level surface on which to rest. Ground preparation is a complex operation that requires the removal of large amounts of material from the sea bed and the leveling of the sea floor. The work is carried out under difficult ocean conditions and over the large distance to be spanned by the barrage.

The long construction time—Because of their large size, caissons can be set only under optimum tidal and weather conditions. Construction time for a conventional tidal barrage is therefore very long. The time factor adds significantly to the financing costs and can become the dominant cost.

For tidal power to be commercially viable, the costs of the civil works (which account for two thirds of the total cost) must be brought down [Clark, p. 2663].

(b) Factors Limiting the Number of Suitable Sites for Conventional Tidal Power Plants Although the amount of tidal energy available is vast, the fraction that can be extracted using current technology is very small. To produce electricity at commercially competitive rates, a tidal power station must generate large amounts of power from a barrage of comparatively short length. These requirements limit the number of potential sites to estuaries with very special features. First, the tidal range must be very high so that the available energy is large. Second, a large estuary is required since the energy available is proportional to the area of the basin enclosed by the barrage. Third, since the cost of the barrage is proportional to its length, a tidal barrage becomes economical only when built across an estuary with a narrow mouth. Worldwide, the number of estuaries with sufficiently high tides, large areas and narrow mouths is very small. Lists typically include less than thirty potential sites worldwide. Furthermore, sites tend to be at high latitudes and in remote areas. Under these restrictions, conventional tidal power can never become a major contributor to worldwide energy production. Clearly a new approach is required which can tap the vast potential of tidal energy.

(c) The Negative Environmental Impact of Conventional Tidal Power Plants

A conventional tidal barrage is built across the mouth of an estuary and therefore disrupts the ebb and flow of the tides which play an essential role in the ecology of an estuary. Because estuaries are fragile and environmentally vital, concern about the ecological impact of tidal barrages has been an obstacle to their construction. One solution to the problem is to build an enclosed tidal lagoon entirely offshore. Tidal Electric Ltd. has proposed such an offshore lagoon enclosed by a rubble mound impoundment wall [www.tidalelectric.com]. However such a structure generates its own ecological problems. A rubble mound wall is necessarily massive and once built, must be considered permanent. The construction of massive, permanent, near shore structures raises a new set of ecological of issues. Furthermore, it is not clear that such structures are cost effective.

(d) The Pulsed Nature of Tidal Power

Tidal turbines requires a large difference in water levels across the barrage. Power is therefore generated over short periods of time when the difference is sufficient. Tidal power therefore comes in pulses and must therefore be supplemented by on demand sources such as thermal or nuclear power plants.

BACKGROUND OF INVENTION—OBJECTS AND ADVANTAGES

The Tidal Energy System and Modular Barrier Construction

In order for tidal power to become more widespread, the obstacles described above must be overcome: (a) The cost of tidal power plants must be brought down. In particular the cost of the civil works must be reduced. (b) Tidal power plants must be designed so as to increase the number of suitable sites at which they can be built. (c) Tidal power plants must be designed to minimize their environmental impact. (d) It is desirable to find a solution to the pulsed nature of tidal power. The Tidal Energy System is a tidal power plant that meets the first three requirements simultaneously. It is built using Modular Barrier Construction, a method that significantly reduces the cost of the civil works. The Tidal Energy Systems can be built over a wide range of locations. In addition, it addresses the environmental impact of tidal power.

The Tidal Energy System: Reducing the Cost of the Civil Works

The Tidal Energy System using Modular Barrier Construction reduces the cost of the civil works in several ways that include the following:

The Tidal Energy System using Modular Barrier Construction reduces the required amount of material to a fraction of that needed for a conventional tidal barrage.

The Tidal Energy System using Modular Barrier Construction eliminates the need to level sea floor. It therefore eliminates the extensive ground preparation required for a conventional tidal barrage.

The Tidal Energy System built using Modular Barrier Construction requires a fraction of the construction time needed to build a conventional tidal barrage. The financing costs are thereby proportionally reduced.

The large amount of material, the need to provide a level surface for caissons, and long construction time are the main factors in the high cost of a conventional tidal barrage. Estimates suggest that the cost of the civil works for the Tidal Energy System are half those of a conventionally built barrage of equal generating capacity.

The Tidal Energy System: Increasing the Number of Sites Suitable for Tidal Power By reducing construction costs, Modular Barrier Construction makes it cost effective to build longer structures. Increased length makes a variety of configurations of the Tidal Energy System possible (see FIG. 1A and 1B). It can be built entirely offshore or it can be partially bounded by the shoreline. The need for an estuary is completely dispensed with, thereby making it possible to build a Tidal Energy System almost anywhere with sufficiently high tides. The number of suitable sites is thereby vastly increased.

The Tidal Energy System: Reducing the Environmental Impact of Tidal Power Generation Since the Tidal Energy System eliminates the need to build across the mouth of an estuary, the hydrology and therefore ecology of the estuary is not affected. The major environmental objection to tidal energy is thereby removed.

The Tidal Energy System has distinct advantages over the rubble mound impoundment wall developed by Tidal Electric Ltd. A rubble mound impoundment wall is an enormous structure which once built must be considered permanent. The Tidal Energy System built using Modular Barrier Construction is a much less massive structure. Furthermore, the technology used in Modular Barrier Construction makes is possible to decommission and remove the plant. Decommissioning cost can be readily calculated. The Tidal Energy System is therefore far less environmentally intrusive.

In addition to resolving three of the major problems faced by tidal power, the Tidal Energy System has further advantages:

The Tidal Energy System: Generating Power from other Ocean Energy Resources

The Tidal Energy System can be configured to extract energy from the kinetic energy of tidal flows (see FIG. 9). Where applicable, this configuration adds to the generating capacity of the Tidal Energy System.

The Tidal Energy System can serve as a platform for wave machines. These include Oscillating Water Column (OWC) generators such as Wavegen Ltd.'s Limpets (see FIG. 8) [www.wavegen.co.uk/what_we_offer_limpet.htm]. The Tidal Energy System provides a natural platform for OWC devices. Further, since wave energy machines absorb energy, they serve to protect the Tidal Energy System from the destructive action of waves while simultaneously adding to its total energy output.

Wind turbines can also be readily integrated into the Tidal Energy System further adding to its total energy production.

The Tidal Energy System: Resolving the Pulsed Nature of Tidal Power

The pulsed nature of tidal power has always been one of its drawbacks. The Tidal Energy System reduces the severity of the problem.

Unlike conventional barrage construction, Modular Barrier Construction renders double-effect power generation cost effective. Double-effect generation gives flexibility in matching times of energy production with times of energy demand. Therefore:

Modular Barrier Construction when combined with double-effect power generation reduces the severity of the problem of pulse generation resulting from tidal power.

Although Modular Barrier Construction facilitates a mode of power production that reduces the negative impact of the pulsed power, hydrogen technology can be readily integrated into the Tidal Energy System to eliminate the problem altogether. Some of the power produced by the Tidal Energy System is diverted to electrolyzers to extract hydrogen electrolytically from water. The hydrogen is stored and then used in fuel cells to produce on demand power. The cost effectivness of Modular Barrier Construction, the flexibility of the Tidal Energy System to operate for maximum output at minimum cost, together with an anticipated drop in the price of electrolyzers and fuel cells result in a system that is capable of producing cost effective, on demand electric power. Therefore The Tidal Energy System can therefore produce on demand electrical energy that is cost effective, on demand, dependable, virtually limitless and is free of greenhouse gases.

In addition, the excess energy produced by the the Tidal Energy System can be diverted towards the production of hydrogen as an end produced.

The Tidal Energy System expanded to include electrolyzers and fuel cells can be operated for the production of hydrogen for the anticipated hydrogen economy.

SUMMARY

The Tidal Energy System is a structure capable of extracting energy from the potential and kinetic energies of the tides, as well as from ocean waves and offshore wind. Unlike conventional tidal power stations, the Tidal Energy System is cost effective, can be built at a large number of sites, and addresses the major environmental concerns associated with tidal power. It can be operated flexibility to match more closely times of high energy demand with energy production. Electrolyzer and fuel cell technology can be readily integrated into the the Tidal Energy System to produce cost effective, on demand power. The energy produced is dependable, limitless, and free of greenhouse gases. In addition, excess electric power can be diverted towards the production of hydrogen for the anticipated hydrogen economy.

DRAWINGS—FIGURES

FIG. 1 shows two configurations of the Tidal Energy System showing its essential structure.

FIG. 2 shows a Tidal Containment Wall Section, the basic unit of the Tidal Containment Wall.

FIG. 3 shows two views of the Support Column, the basic unit of the framework which holds the entire structured of Tidal Energy System in place.

FIG. 3C shows a Tripod Support Column.

FIG. 4 shows a Pile being driven through the Support Column Guide Shaft and into the sea floor.

FIGS. 5 & 5A show two cross sectional views of two Panels.

FIG. 6 shows a Locking Post being lowered between the Panels and the Support Columns.

FIG. 6A shows a Locking Post together with the Grout Channel and Grout Ducts through which grout will be forced provide a seal against water seepage.

FIG. 7 shows caisson placement.

FIG. 7A shows the Caisson Platform, the structure into which the Power Caisson will be placed.

FIG. 7B shows a Turbine/Generator Caisson after it has been set on the Caisson Platform Panels.

FIG. 8 shows an example of an oscillating water column wave machine such as those which can be mounted on the Tidal Containment Wall to generate energy and protect the structure.

FIG. 9 shows the Tidal Containment Wall configured so as to funnel tidal streams into the Turbine/Generator, thus generating energy from tidal currents.

FIG. 10 shows Wind Turbine/Generators mounted on the Support Columns of Tidal Containment Wall.

FIG. 11 shows a flow chart for the production of hydrogen and its reuse in fuel cells to generate electric power

DRAWINGS—REFERENCE NUMERALS

(10) Support Column
(11) Tripod Support Column
(12) Locking Post
(13) Tripod Leg
(14) Locking Post Insert Channel
(15) Grout Channel
(16) Panel Support Flange
(17) Grout Ducts
(18) Braces
(20) Pile
(22) Pile Guide Sleeve
(24) Pile Hammer
(30) Panel
(31) Base Panel
(32) Sealing Embankment
(34) Caisson Platform Panel
(35) Caisson Platform
(36) Tidal Containment Wall Section
(37) Caisson Section
(40) Wave Machine
(42) Air Chamber
(44) Wave Machine Turbine
(46) Wave Machine Generator
(48) Air Duct
(50) Tidal Containment Wall
(52) Artificial Tidal Lagoon
(60) Turbine/Generator Caisson
(70) Tidal Energy System
(80) Wind Turbine/Generator
(90) Electrolyzer
(92) Hydrogen Storage System
(93) Fuel Cell

DETAILED DESCRIPTION—FIGS. 1 TO 7—
PREFERRED EMBODIMENT

Components of the Tidal Energy System

FIG. 1 shows two configurations of the basic version of the Tidal Energy System(70). A Tidal Containment Wall (50) encloses an interior body of water, the Artificial Tidal Lagoon (52). Turbine/Generator Caissons (60) are incorporated into the Tidal Containment Wall (50). The Tidal Containment Wall is assembled from Tidal Containment Wall Sections (36) (FIG. 2).

Each Tidal Containment Wall Section (FIG. 2) consists of four basic components: (i) the Support Columns (10), which form the framework and hold the Tidal Containment Wall Section together, (ii) the Piles (20), which the secure the Support Columns to the sea bed, (iii) the Panels (30), which separate the Artificial Tidal Lagoon from the surrounding ocean, and (iv) the Locking Posts (12) which secure the Panels to the Support Columns.

Support Columns (10) form the framework of the Tidal Containment Wall (FIGS. 1A & 1B). FIGS. 3A & 3B show the basic features of a Support Column, each feature having a specific function. A Pile Guide Sleeve (22) is fabricated along the length of each Support Column. The Pile (20) which anchors the column to the sea floor will slide through the Pile Guide Sleeve. FIG. 4 shows the Pile (20) passing through the Pile Guide Sleeve (22) as it is driven into the sea floor. A second feature of the Support Column is the Locking Post Insert Channel (14) which runs the length of the Column (10). A Locking Post (12) will be inserted into the Locking Post Insert Channel (14) to hold Panel and Support Column firmly together. A third feature is the Panel Support Flange (16) on which the Base Panel of each Tidal Containment Wall Section rests (FIGS. 2, 3A & 3C). Finally, each Support Column is provided with Support Braces (18) against which panels are held while the Locking Post is inserted.

Variants of the these features are possible. An alternative (not shown) to the Pile Guide Channel are the so called "skirt piles" in which pile guide sleeves are placed around the support column (thus forming a "skirt"). Yet another alternative (FIG. 3C) is the Tripod Support Column (11) in which the Tripod Legs (13) are bracketed out from the Support Column. The Tripod Support Column (11) shares all basic features with the Support Column (10). It is constructed with Pile Guide Sleeve(s) (22), a Locking Post Insert Channel (14), Braces (18), and Panel Support Flanges (16) (FIG. 3A). Not all these features appear from the perspective of FIG. 3C.

FIGS. 5 and 5A show the Panels (30). These form the wall separating the Artificial Tidal Lagoon from the surrounding ocean. Panels can be precast from reinforced concrete. They are interlocking so that they can be set one on top of the other easily and with minimum adjustment. Panels can be cast with a slight arch (FIG. 5A) so as to be under compression when acted on by the hydrostatic pressure resulting from the higher water level in lagoon or ocean. Each panel is cast with a Locking Post Insert Channel (14) along both vertical edges. The Locking Post (12) will be inserted into the Locking Post Insert Channel (14) to hold Panel and Support Column together.

FIG. 6A shows a Locking Post (12). FIG. 3B shows what the Locking Post does. When a Panel (30) is set adjoining a Support Column, its Locking Insert Channel and that of the Support Column form a single joint channel. Examination of FIG. 3B shows that once the Locking Post is inserted into this channel, the Panel is prevented from any lateral movement. The Panel will be locked in place. FIG. 6 shows a Locking Post (12) being inserted between a Panel (30) and Support Columns (10) to secure them together. Each Locking Post can be manufactured with a Grout Channel (15) which runs vertically down its length (FIG. 6A). The Grout Channel connects to Grout Ducts (17). Once the Locking Post is inserted between Panel and Support Column, grout will be forced under pressure down the Grout Channel and through the Grout Ducts to provide a seal to prevent the flow of water between the ocean and the Lagoon through the space between the Panel and the Support Column.

Modular Barrier Construction

The Tidal Energy System is built using Modular Construction. Modular Barrier Construction builds the Tidal Containment Wall one section at a time (FIGS. 2 & 3). Each of the four main components a Tidal Containment Wall Section (36) (the support columns, (10), the Piles, (20), the Panels, (30), and the Locking Posts which secure the Panels to the Support Columns—see FIG. 2) are prefabricated on shore and are floated or barged out to the site.

Once at the site, Tidal Barrier Wall sections (FIG. 2) are assembled one section at a time. First, a Support Column is erected. Using controlled floatation, the Support Column is set upright at the desired location on the sea floor. Next, the Support Column is secured to the sea floor. The process is illustrated in FIG. 4. A Pile (20) is driven into the sea floor through the Pile Guide Sleeve (22). Where loads demand it, several Piles can be driven into the sea floor through additional Pile Guide Sleeves fabricated into the Support Column. The Pile(s) is driven into the seabed by means of a Pile Hammer, (24), which is usually operated from a barge. Similar methods are used for skirt piles and Tripod Support Columns (FIG. 3C). The depth to which the Pile is driven depends on the stratigraphy of the seabed and on anticipated loads. Piles have been driven to depths of over 120 meters. Once the Pile(s) is driven to the desired depth, grout is forced into the space between the Pile Guide Sleeve and the Pile. The Support Column and the Pile are now securely grouted together into a single unit, thereby preventing the Support Column from any vertical motion over time. The Support Column is now firmly attached to the sea floor.

Once a pair of Support Columns (10) are secured to the seabed, insertion of the Panels (30) begins. FIG. 2 shows the final results. Each Tidal Barrier Wall Section is assembled from interlocking Panels (FIG. 5). Panels (30) are floated out to the site and installed. First, a Base Panel (31) is inserted between two support columns. Using controlled floatation, it is lowered onto the support Flanges, (16). The Flanges insure that the Base Panel will be level. A system of Braces, (18), aid in the control of the panel while it is being installed (FIG. 3A). Each Panel is held against the braces as it is being lowered into place. Once the Panel is positioned between two Support Columns, it is locked into place. FIG. 6 illustrates the procedure. A Locking Post (12) is inserted through adjoining Locking Post Insert Channels, (14), of the Panel and Support Column. Once a Locking Post is inserted at each end, the Panel will be secure against lateral motion. The remaining Panels are then similarly placed one on top of the other until the Tidal Containment Wall Section is completed. FIG. 2 shows a completed Tidal Containment Wall Section. Construction of the adjacent section can now proceed thereby extending the Tidal Containment Wall.[1]

[1] Note the absence of sluice caissons. These are eliminated through the use of double-effect power generation. Flow between estuary and ocean is entirely through the turbine/generators caisson. If single-effect generation is used, then sluice caissons are required. Their essential features and the method of their placement is the same as that for turbine/generator caissons.

Since the sea floor is irregular, there will be a gap between the Base Panel and the sea floor. The gap must be sealed. FIGS. 2 & 6 illustrate how this is accomplished. A Sealing Embankment (32) of minimum height and composed of an appropriate aggregate of crushed rock and gravel is built to close the gap. The Sealing Embankment is then stabilized and further sealed with tremie concrete. (Tremie Concrete is underwater concrete which can be poured under water through a tube called a tremie).

Finally, we must describe the placement of Turbine/Generator Caissons (60) into the Tidal Containment Wall. The placement of a Turbine/Generator caisson is illustrated in FIG. 7. The procedure is essentially the same as that used in the construction of a Tidal Containment Wall Section. First, three pairs of Support Columns (10) are erected (FIG. 7A). A Caisson Platform Panel (34) is placed between each pair of Support Columns. A Sealing Embankment (not shown) is built up around each of the panels. The Embankments are stabilized and sealed with tremie concrete. The three Caisson Platform Panels (34) form the Caisson Platform (35) on which to rest the Turbine/Generator caisson. The caisson is floated out to the site and lowered onto the Caisson Platform Panels (34). Each Turbine/Generator Caisson is cast with three Locking Post Insert Channels (14) along each of its sides. Once set on the Caisson Platform (35), Locking Posts (12) are inserted between the caisson and the columns (FIG. 7B). Once in, the Locking Posts will hold the Turbine/Generator Caisson and the Support Columns securely together. The Support Columns (10), the Caisson Platform (35), the Turbine/Generator Caisson (60) together form a Caisson Section (37).

The electrical system is now be installed and the Tidal Energy System is tied into the grid. The procedures for the installation of the electrical system are the same as those used for a conventional tidal barrage.

The Tidal Energy System, in its preferred embodiment, operates in the same way as a conventional tidal barrage (FIG. 1). The Tidal Containment Wall (50) encloses an Artificial Tidal Lagoon (52). Turbine/Generator caissons (60) are built into the Tidal Containment Wall (50). As the tide rises, the level of the water in the ocean becomes higher than that in the Lagoon. When the difference is sufficient, sluice gates are opened, allowing water to flow from the ocean through the turbines driving the generators and producing electric power. The process can be reversed when the tide goes out.

Many of the cost advantages which Modular Barrier Construction gives the Tidal Energy System over conventional barrage construction emerge from the discussion above.

Analysis of the Cost Advantages if the Tidal Energy System:

The Tidal Energy System built using Modular Barrier Construction requires far less reinforced concrete than a conventional tidal power station of equal generating capacity. The result is a substantial reduction in cost.

Modular Barrier Construction reduces the amount of reinforced concrete by replacing blank and sluice caissons with Tidal Containment Wall Sections (36) (FIGS. 1 & 2). In addition to the Turbine/Generator caissons, a conventional tidal barrage requires massive blank caissons (80 m×50 m). Modular Barrier Construction replaces these massive caissons with reinforced concrete panels of order 1 meter in thickness. Caissons are stable against hydrostatic pressure, tidal streams and other environmental loads by virtue of their size and mass. Modular Barrier Construction replaces size and mass by strength derived form the Support Columns (10) (FIGS. 1, 2, 4, 6 & 7). The result is a great reduction in the amount of reinforced concrete required to build a tidal power plant. The cost of the civil works is proportionally reduced.

By using double-effect power generation, sluice caissons are rendered unnecessary. When conventional barrage construction is used, cost is not greatly reduced since the massive sluice caissons are replaced by equally massive blank caissons. Further, the equipment for double-effect is more expensive than for single-effect, cancelling the savings derived from the elimination of the water control equipment in the sluice caisson. The overall result is a modest gain in power (see p. 2) for a modest increase in cost. On the other hand, Modular Barrier Construction achieves great savings by using double-effect power generation since the eliminated sluice caissons are not replaced by blank caissons. Rather the massive (50 m×80 m) sluice caisson is replaced by a Tidal Wall Section consisting of Panels having a thickness of order 1 m. The result is a substantial reduction in cost. Further reduction in material use is acheived by the Tidal Energy System. In order to contain costs, a conventional tidal barrage is built across the narrowest part of an estuary regardless of the size of the basin enclosed behind the barrage. As a result, the amount of water that must flow through the barrage is not matched to the generating capacity of the system. Sluice caissons are therefore required to control the flow of water in and out of the estuary. Modular Barrier Construction adjusts the size of the Artificial Tidal Lagoon to match the electrical generating capacity. The result is that sluice caissons are essentially eliminated from the Tidal Energy System.

The use of double-effect mode has an additional advantage. Because four pulses of energy are generated instead of the two produced by single-effect Double-effect power generation is more responsive to demand than single-effect power generation.

Although this does not eliminate the problem of the pulsed nature of tidal power, the added flexibility helps integrating tidal energy into the power grid.

Modular Barrier Construction reduces cost by eliminating the extensive ground preparation required for a conventional tidal barrage.

Ground preparation is a major part of building a conventional tidal barrage. In a conventional tidal barrage, caissons require a level surface. The sea floor must therefore be leveled and carefully covered with a layer of crushed rock. Modular Barrier Construction eliminates this major piece of engineering altogether. A much simpler procedures seals Tidal Energy System. A Base Panel (31) is set onto the Flanges of the Support Columns (10) (FIG. 2). The gap between the Base Panel and irregularities and outcroppings in the sea floor is filled in by a Sealing Embankment (32). No ground preparation is required. The elimination of ground preparation required in the construction of a conventional tidal barrage results in further and substantial reductions in cost.

Modular Barrier Construction reduces construction time to a fraction of that required for a conventional tidal power station. Since the time factor is a major if not the dominant component in financing, substantial cost reduction is achieved.

Two major factors contribute to the long construction time for a conventional tidal barrage. The first is ground preparation. Modular Barrier Construction replaces this step with the much shorter procedure of building a low Embankment. The second is the time required for the placement of caissons. Caisson placement for a conventional tidal barrage requires special tidal and weather conditions. Typically, caissons can be set at a rate of two per month. Modular Barrier Construction replaces sluice and blank caissons[2] by Panels (FIG. 2) held in place between Support Columns. Placement of panels proceeds at a rapid pace and is independent of tidal conditions. It is estimated that a Tidal Energy System requires one third the construction time needed for the construction of a conventional tidal power station of equal generating capacity. Since the time factor can be the dominant component in financing, the reduction in construction time yields substantial savings in the final cost of tidal power.

[2]Two thirds of the caissons in the Severn Barrage were to be sluice or blank caisson [The Severn Barrage Project p viii].

In addition to reducing cost, the Tidal Energy System resolves two more major impediments to the development of tidal power.

The Tidal Energy System Increases the Number of Suitable Sites For Tidal Power

Because construction costs are high, the distance spanned by a conventional tidal barrage must be kept to a minimum. A conventional tidal barrage requires a large tidal range and large estuary with a narrow mouth. The number of such estuaries is limited to handful worldwide. Because Modular Barrier Construction reduces construction costs sufficiently, longer structures can be built and still remain cost effective. The added flexibility makes it possible to configure The Tidal Energy System in various ways. Two configurations are shown in FIG. 1. These configurations eliminate the need for an estuary altogether, requiring only large tides to be cost effective. The result is that a Tidal Energy System can be built almost anywhere with sufficiently high tides, a condition that can be met at a very large number of locations. The number of such locations meeting this requirement is very large. The severe limitation on the number of suitable sites for tidal energy is thereby removed.

The Tidal Energy System Reduces the Environmental Impact of Tidal Power

Because the Tidal Energy System does not require blocking the mouth of an estuary, the major environmental objection to tidal power is removed. It is also clear that Modular Barrier Construction makes decommissioning completely feasible. Panels and caissons can be readily removed. Methods for removing the Support Columns have been developed by the offshore oil and gas industries. Unlike Tidal Electric's rubble impoundment wall, the Tidal Energy System is not a permanent structure.

In summary, the Tidal Energy System using Modular Barrier Construction meets three of the major challenges preventing the development of tidal power. (a) It reduces the cost of tidal power thereby making it cost effective. (b) It makes it possible to build tidal power stations at a large number of locations. (c) It avoids blocking estuaries and therefore removes the major environmental objection to tidal power.

FIG. 8—Alternative Embodiment

In this alternative embodiment of the Tidal Energy system, wave energy machines are added to the Tidal Energy System to protect Tidal Energy System from the destructive power of the waves and to generate electric power.

As they rise and fall, waves can exert a substantial load. The Tidal Energy System can be protected from the destructive action of waves by wave machines. FIG. 8 shows such a machine, an Oscillating Water Column Machine (OCW) similar to those manufactured by Wavegen Ltd. [www.wavegen.co.uk/what_we_offer_limpet.htm] OWC wave machines absorb energy from incoming waves and convert it to electric power. An OWC consists of an enclosed air chamber, (42), connected through an air duct, (48) to a Turbine (44)/Generator (46). Incoming waves continuously raise and lower the water level in the air chamber, (42). Because the chamber is enclosed and because the mouth of the chamber is below the water line, the upward and downward motion of the water column drives the air in the chamber through the duct, (48). The air drives the Turbine (44) which in turn drives the Generator (46), thereby producing electrical power. As can be seen from FIG. 8, the geometry of an OWC makes it easy to mount onto the Tidal Containment Wall and is therefore very cost effective. Incorporating wave energy machines protects the Tidal Energy System from the destructive power of the waves while at the same increasing its total generating capacity.

FIG. 9—Alternative Embodiment

In this alternative embodiment, the shape of the Tidal Containment is altered so that the Tidal Energy System can extract energy from the kinetic energy of tidal flows.

Energy can be generated by shaping those sections of the Tidal Containment Wall (50) that face the tidal current so to funnel the tidal current into the turbine (not shown) contained in Turbine/Generators (60) (FIG. 9). This requires a modest addition to the length of the Tidal Containment Wall which can therefore be very cost effective at sites with swift tidal currents. Drawing simultaneously from the kinetic energy of tidal flows and from the potential energy of the tides is an entirely new feature of this system. To date, technologies that draw on one preclude drawing on the other. Calculations show that under optimum conditions tidal flows represent a significant addition to the total power output of the system.

FIG. 10—Alternative Embodiment

In this alternative embodiment wind turbine/generators (80) are mounted onto the Support Columns (10) of Tidal Energy System.

The tower is a major portion of the total cost of an offshore wind turbine. Towers are usually one of two kinds. The first is the monopile, essentially a single large pile which is driven into the sea floor. The Support Columns of The Tidal Energy System can easily be extended into monopile wind turbine towers. The second is the tripod. Its essential structure is the same as the Support Tripod (11) shown in FIG. 3C The addition of wind to the Tidal Energy System is cost effective. The Support Columns of Tidal Energy System provide ready made supports for wind turbines. Furthermore, the wind turbine/generators (not shown) can be tied into the existing electrical system of the Tidal Energy System. Wind adds to the overall capacity at little additional cost.

No FIG. 11—Alternative Embodiment

In this embodiment, large scale Electrolyzers (90), a Hydrogen Storage System (92), and (94) Fuel Cells (94) are added to the Tidal Energy System (70) (FIG. 12). Electricity generated by the Tidal Energy System (70) is used in large scale Electrolyzers (90) for the extraction of hydrogen from water. Hydrogen is then piped to the Storage System(92). From there, the hydrogen is sent high capacity Fuel Cells (94) to generate electricity on demand. It should be noted that since electrolyzers are essentially fuel cells run in reverse, it is possible to have a single electrolyzer/fuel cell system to perform the extraction of hydrogen and its use as a fuel to produce electricity. Considerable savings would result.

The pulsed nature of tidal power has always been considered one of the drawbacks of tidal energy. Tidal power stations generate power in pulses while the demand for power is continuous. Further, times of peak demand do not in general coincide with time of peak tidal power generation. Therefore, the few tidal power plants that have been built are used to supplement power from other sources. In order for tidal power to operate independently as a primary source of electricity, it must produce power on demand. In one proposed solution (twin tidal basin), an additional tidal basin is built to act as storage from which to extact energy. Naturally occuring twin basin have also been considered. To date none have been found to be cost effective [Clark, p. 2653]. Compressed air has been considered for energy storage [Clark, p. 2654].

The present structure proposes to use hydrogen technology as a means of producing power on demand. When operated to produce maximum energy, the Tidal Energy System produces large pulses of inexpensive energy. By releasing water when the difference in water levels between the Artificial Tidal Lagoon and the surrounding ocean is at a maximum, maximum energy is extracted. The cost of electricity produced in this manner is very low. This is in part due to the cost effectiveness of the Tidal Energy System and in part due to the mode of operation. Because it is produced in pulse of short duration, this mode of operation is not useful for direct consumption since end users need energy over an extended period of time. However, for the electrolytic extraction of hydrogen from water, low cost electricity is precisely what is needed for cost. The amount of hydrogen produced will depend mainly on total available electrical energy. The National Academy of Engineering report predicts that "the cost of hydrogen produced by electrolysis will be dominated by the cost of electricity" [Committee on Alternatives and Strategies for Future Hydrogen Production and Use, The National Academy of Engineering, *The Hydrogen Economy: Opportunities, Costs, Barriers, and R&D Need,* The National Academies Press, Washington, D.C. www.nap.edu. p. 10–9. The document was published electronically on the National Academy website and will be published sometime in 2004) The prediction is based on an anticipated drop in the prices of electrolyzers and fuel cells.

Coupled with hydrogen, fuel cell, and electrolyzer technology, the Tidal Energy System produces on demand power and resolves the problem of pulsed power generation from the tides.

FIG. 11—Alternative Embodiment

In this embodiment, large scale Electrolyzers (90), and a Hydrogen Storage System (92) are added to the Tidal Energy (70) (FIG. 12). In this embodiment the final product is hydrogen.

I claim:

1. An enclosure for the extraction of energy from the potential energy contained in the ocean tides comprising the elements:

(a) an array of support columns set at regular intervals in the ocean along the perimeter line determining said enclosure (b) a means of securing said support columns to the ocean floor (c) a predetermined number of panels wherein said panels are placed contiguously one above the other to the approximate height of and fitting precisely between adjacent pairs of said support columns (d) a means of firmly securing said panels between said adjacent pairs of support columns (e) a means of sealing any space between each said panel and the support columns between which said panel is inserted (e) a predetermined number of caissons (f) pairs of support columns placed on either side of predetermined adjacent support columns within the afore mentioned array so as to form two rows of support columns (hereafter referred to as caisson support columns) perpendicular to said perimeter, the distance between two said rows being such that said caisson fits precisely between them (g) support panels inserted between each pair of directly opposite support columns of said two rows so that said caisson rests on said panels and therefore said support panels form a platform between said two rows for caisson (h) turbines, a predetermined number of said turbines being enclosed in each said caisson (i) a means for allowing water to pass through said turbine at the will of a human operator (j) electric generators, each said generator connected to one or more said turbines whereby said elements render said enclosure without gap and thereby separating the ocean without from the interior of said enclosure except at such time as said human operator allows water to pass through said turbines and causing said generators to produce electric power.

2. The enclosure of claim 1 further including devices for the extraction of energy from the ocean waves, said devices being incorporated into the said enclosure and thereby protecting the enclosure from the destructive power of the waves while generating energy.

3. The enclosure of claim 1 wherein sections of predetermined length of said enclosure on either side of some of said caissons form a letter "V" with said caisson at the point of intersection of said sections, thereby funneling tidal currents into the turbine within said caisson, thus energizing the generator(s) connected to said turbine, and thereby converting the kinetic energy of tidal flows into electrical energy.

4. The enclosure of claim 1 further including wind turbines mounted on said enclosure.

5. The enclosure of claim 1 further including
  (a) a means whereby hydrogen is generated electrolytically from water
  (b) a means whereby hydrogen is stored.

6. The enclosure of claim 5 further including a means whereby hydrogen is used in the production of electric power.

* * * * *